United States Patent
Fischperer

(10) Patent No.: US 6,213,269 B1
(45) Date of Patent: Apr. 10, 2001

(54) POWER SUPPLY FOR A LONGITUDINAL STATOR DRIVE

(75) Inventor: Rolf Fischperer, Berlin (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/155,318

(22) PCT Filed: Apr. 9, 1997

(86) PCT No.: PCT/DE97/00725

§ 371 Date: Sep. 25, 1998

§ 102(e) Date: Sep. 25, 1998

(87) PCT Pub. No.: WO97/39912

PCT Pub. Date: Oct. 30, 1997

(30) Foreign Application Priority Data

Apr. 18, 1996 (DE) ............................................... 196 15 346
Mar. 5, 1997 (DE) ............................................... 197 08 993

(51) Int. Cl.[7] ......................................................... B60L 9/00
(52) U.S. Cl. ........................ 191/10; 104/130.03; 104/242
(58) Field of Search ........................ 104/130.01, 130.03, 104/290, 292, 294; 310/12, 13, 14; 318/135; 191/2, 6, 10, 22 R

(56) References Cited

U.S. PATENT DOCUMENTS 3,854,411 * 12/1974 Lichtenberg ................... 104/103.03
5,499,583 * 3/1996 Blumel ........................... 104/130.03

FOREIGN PATENT DOCUMENTS

| 25 44 665 | 4/1977 | (DE) . |
| 28 05 994 | 8/1979 | (DE) . |
| 2 688 523 | 9/1993 | (FR) . |

OTHER PUBLICATIONS

"Energieversorgung des Langstatorantriebs" [Supplying Power to a Long-Stator Drive], J. Meins, "etz", vol. 108, No. 9, 1987, pp. 378–381.*

"Stand der Entwicklung des elektromagnetischen Schnellbahnsystems" [Development Status of the Electromagnetic High-Speed Railway System], Von Rudolf Zurek, ZEV-Glas. Ann., vol. 104, Nos. 8–9, Aug.–Sep. 1980, pp. 233–240.*

* cited by examiner

Primary Examiner—Mark T. Le
(74) Attorney, Agent, or Firm—Kenyon & Kenyon

(57) ABSTRACT

A power supply system for a long-stator drive having at least two independent tracks, which each have at least one long-stator section and which can be connected to one another using at least one track-changing device, the long-stator sections being split into a plurality of drive regions, using which each vehicle can be independently driven, and at least one track-changing device having at least one electrical contact which is positively guided by the track-changing device in such a manner that an electrical connection can be produced or eliminated between various long-stator sections.

3 Claims, 5 Drawing Sheets

POWER SUPPLY FOR A LONGITUDINAL STATOR DRIVE

FIELD OF THE INVENTION

The present invention relates to a power supply system for a long-stator drive.

BACKGROUND INFORMATION

A conventional power supply system is described, for example, in German Patent No. 28 05 994. The conventional power supply system has two mutually independent tracks, each having a long-stator winding. The winding sections of each track can be connected to the substations via two parallel power cables and switching devices. The switching devices include non-contacting semiconductor switches and contacting switching elements. The contacting switching element is closed by the corresponding semiconductor switch before the voltage is connected, while in contrast the contacting switching element is opened by the semiconductor switch after the voltage has been disconnected.

Furthermore, "Energieversorgund des Langstatorantriebs" Supplying Power to a Long-Stator Drive), J. Meins, "etz", Vol. 108, No. 9, 1987, pp. 378–81 describes a conventional power supply system for a long-stator drive. This power supply system includes a track having a left and a right motor side. A plurality of long-stator sections are combined to form at least one drive region. Each drive region is characterized in that all its stator sections are supplied with power by the same converter. The limits for the drive regions are generally chosen such that these limits are at the preselected interval between trains, so that a plurality of vehicles may travel at the same time interval on the single track.

In addition, for a track having a long stator, a track-changing device, designed as a switch, is described in "Stand der Entwicklung des elektromagnetischen Schnellbahnsystems" (Development Status of the Electromagnetic High-Speed Railway System), Von Rudolf Zurek, ZEV-Glas. Ann., Vol. 104, Nos. 8–9, August–September 1980, pp. 233–40. The relevant switching section ends at the moving end of the switch.

In addition, French Patent No. 2,688,523 describes a track-changing device for two independent tracks of a long-stator drive. The track-changing device is designed as a switch and the two independent tracks each have at least one long-stator segment.

Finally, German Patent No. 25 44 665 describes a mechanically regulatable switch for a magnetic overhead railway. The switch includes a movable tongue, on which a stator winding of a linear motor and secondary conductor loops, situated beneath, are arranged.

SUMMARY OF THE INVENTION

An object of the present invention is to simplify supplying power to a long-stator section. The relevant switching section ends at the moving end of the switch.

In addition, French Patent 2,688,523 A1 discloses a track-changing device for two independent tracks of a long-stator drive. The track-changing device is designed as a switch and the two independent tracks each have at least one long-stator segment.

The object of the present invention, in the case of a power supply system for a long-stator drive, is to make it simple to supply power to a long-stator section which is routed via at least one track-changing device.

The power supply system according to the present invention for a long-stator drive includes at least two independent tracks which each have at least one long-stator section and which can be connected to one another using at least one track-changing device. The long-stator sections are split into a plurality of drive regions, by means of which each vehicle can be independently driven. At least one track-changing device has at least one electrical contact which is positively guided by the track-changing device in such a manner that an electrical connection can be produced or eliminated between various long-stator sections.

In the case of a power supply system, at least one long-stator section is connected to one drive region or the other. The limits of the drive regions can therefore be set as required. The track or parts of it can thus be assigned to different drive regions as a function of the position of the track-changing device or devices. The time during which the drive regions are occupied can thus be adjusted in a simple manner.

Reliable disconnection of the relevant long-stator section is necessary, for example, if the vehicle is moving towards an open switch end, under conditions of a fault having occurred. The switches would therefore have to be monitored continuously for correct operation by very expensive monitoring devices in the highest safety category. In the event of a fault, i.e., in the event of the failure of the monitoring device or failure of the switching devices, all the drive regions which could be supplied on the relevant track region must be disconnected from the power supply system. This generally results in a serious operational disturbance.

The cabling cost for a power supply system according to an exemplary embodiment of the present invention is particularly low, whereas, in contrast, a power supply system according to another exemplary embodiment of the present invention allows large drive regions to be reconfigured.

DETAILED DESCRIPTION OF THE INVENTION

Figure 1:
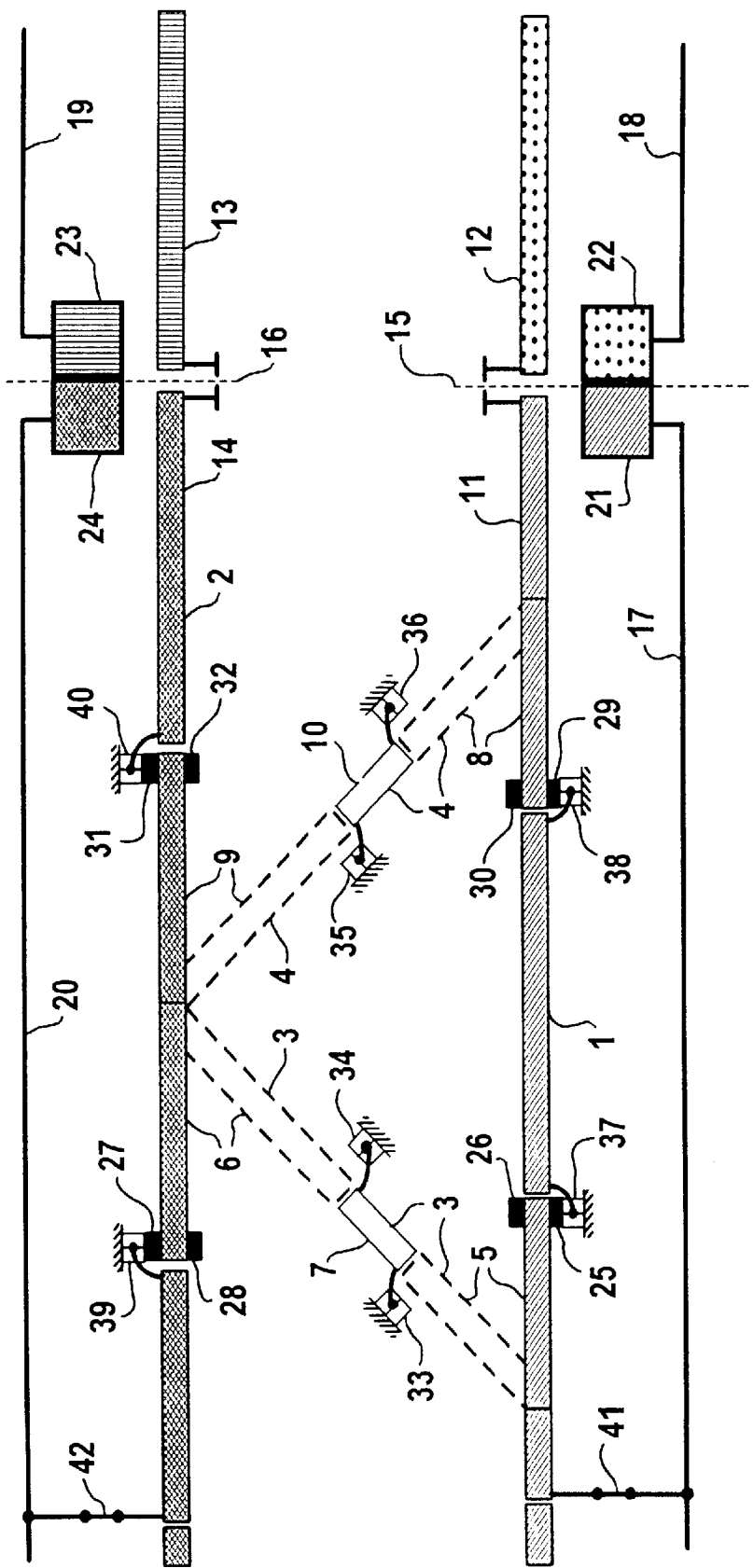
FIG. 1 shows a section having two parallel-running tracks in normal operation.
Figure 2:
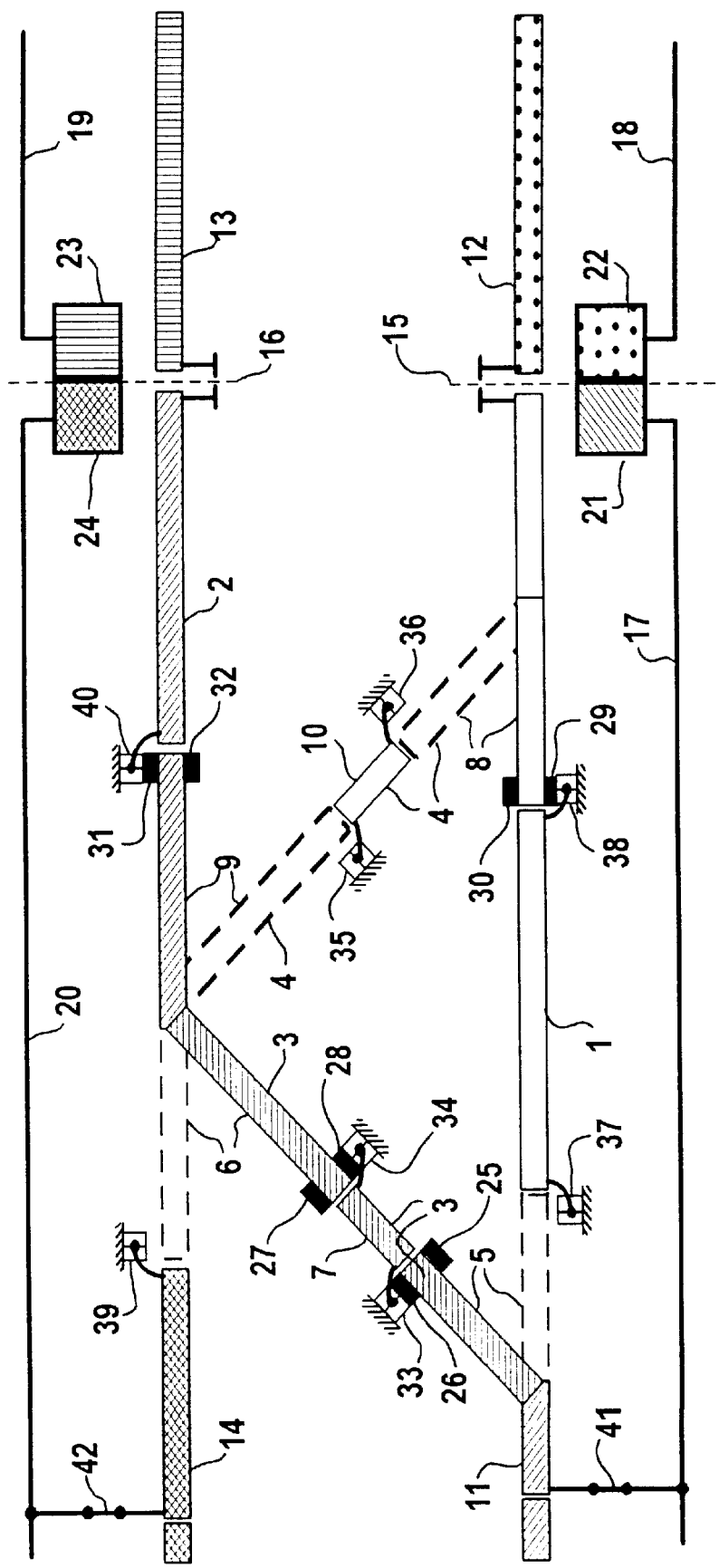
FIG. 2 shows the section according to FIG. 1 with a fault in one drive region.
Figure 3:
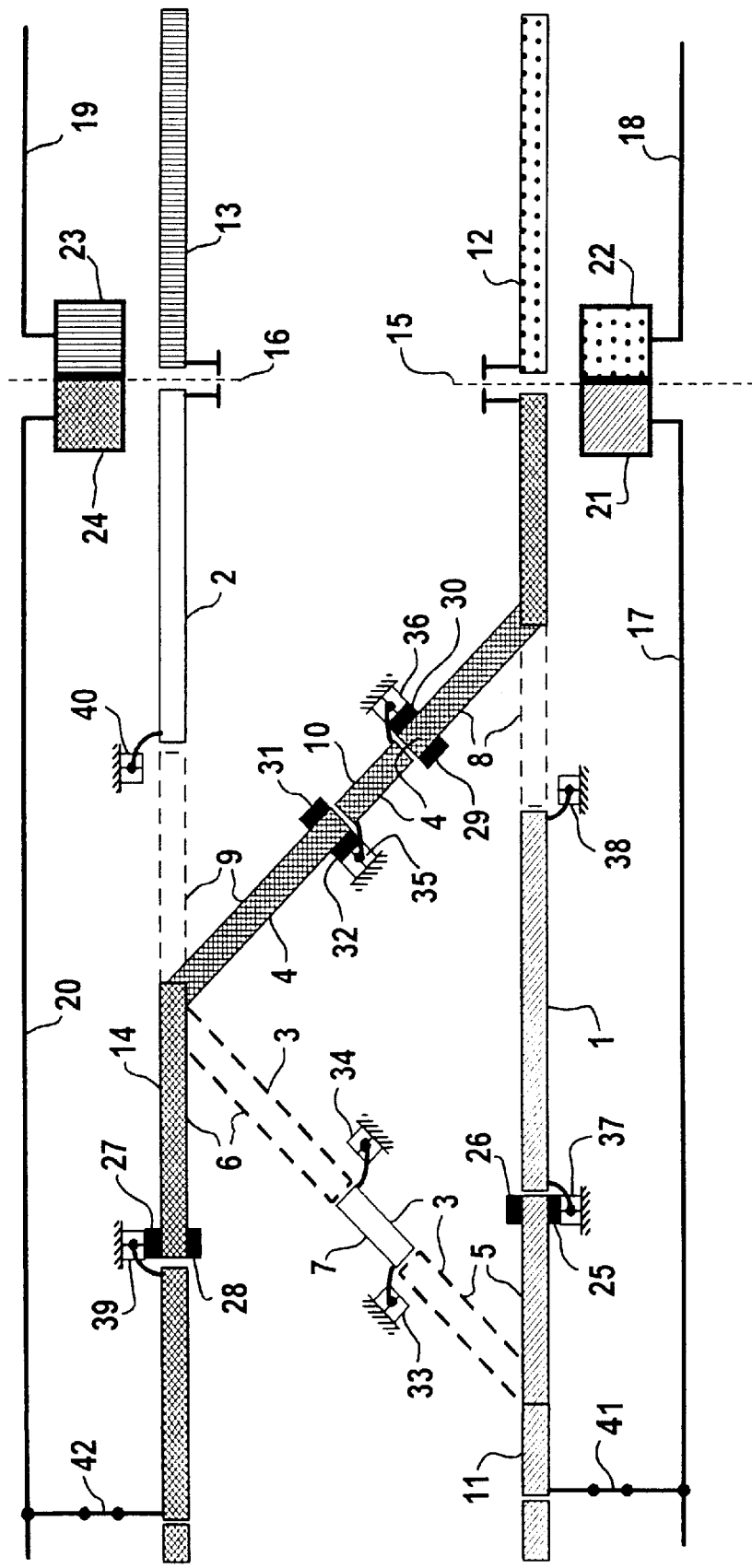
FIG. 3 shows the section according to FIG. 2 with a fault in another drive region.

FIGS. 1–3 show a first track 1 and a second track 2. Two tracks 1 and 2 can be connected to one another using two transfer points 3 and 4.

In the illustrated exemplary embodiment, transfer point 3 includes two switches 5 and 6 as well as a rigid track part 7. Analogously, transfer point 4 includes two switches 8 and 9 as well as a rigid track part 10.

FIGS. 1 to 3 illustrate four drive regions. In normal operation (FIG. 1), drive regions 11 and 12 are assigned to track 1, and drive regions 13 and 14 to track 2.

In FIGS. 1 to 3, drive region 11 is shaded diagonally, drive region 12 is dotted, drive region 13 is shaded vertically, and drive region 14 is shaded by crossed lines.

Drive regions 11 and 12 have a common drive region limit 15, and drive regions 13 and 14 have a common drive region limit 16. The train sequence is governed by drive region limits 15 and 16.

In order to make it possible to change quickly from track 1 to track 2, transfer points 3 and 4 should be arranged as close as possible to drive region limits 15 and 16. Direct arrangement at track region limits 15 and 16 is generally not possible, for routing reasons. Drive regions 11 to 14 are supplied in a conventional manner via section cables 17 to 20, from drive blocks 21 to 24.

Each switch 5 and 6 as well as 8 and 9 is assigned, in each case, two contacts 25 to 32. Contacts 25 and 26 are, in this context, positively guided by switch 5, contacts 27 and 28 by switch 6, contacts 29 and 30 by switch 8, and contacts 31 and 32 by switch 9.

The position of the switch thus governs the track with which contact is made. Rigid track part 7 of transfer point 3 has two mating contacts 33 and 34. Rigid track part 10 of transfer point 4 has two mating contacts 35 and 36.

Furthermore, track 1 has mating contacts 37 and 38 in the region of switches 5 and 8. Track 2 has mating contacts 39 and 40 in the region of switches 6 and 9.

In normal operation (FIG. 1), tracks 1 and 2 are separated from one another, drive region 11 being connected to section cable 17 via a closed supply switch 41, and drive region 14 being connected to section cable 20 via a closed supply switch 42. In normal operation, contact 25 of switch 5 makes contact with mating contact 37 of track 1, and contact 29 of switch 8 makes contact with mating contact 38 of track 1. In the same way, contact 27 of switch 6 makes contact with mating contact 39 of track 2, and contact 31 of switch 9 makes contact with mating contact 40 of track 2.

If a fault occurs in drive region 12 (FIG. 2), then a connection is made between track 1 and track 2 by switching switches 5 and 6 of transfer point 3. In consequence, drive region 11 extends directly to drive region 13, although these drive regions do not adjoin one another in normal operation (FIG. 1). This means that, on the one hand, the occupancy time of drive region 11 is not significantly changed and, on the other hand, drive region 14 is not unnecessarily blocked (overoccupied) by the vehicle transferred from drive region 11 but rather the vehicle assigned to it can travel as before. Furthermore, in the event of a fault, it is always sufficient to disconnect the drive region (for example, drive region 11) which is assigned to the affected vehicle, since it is not possible for other drive regions (for example, drive region 14) to influence the affected vehicle, so that unnecessary disconnections of a plurality of drive regions are avoided.

In the event of a defective drive region 11, those parts of the drive regions of track 1 and track 2 which are still intact are likewise connected to one another, in an analogous manner, by switching switches 8 and 9.

Figure 4:
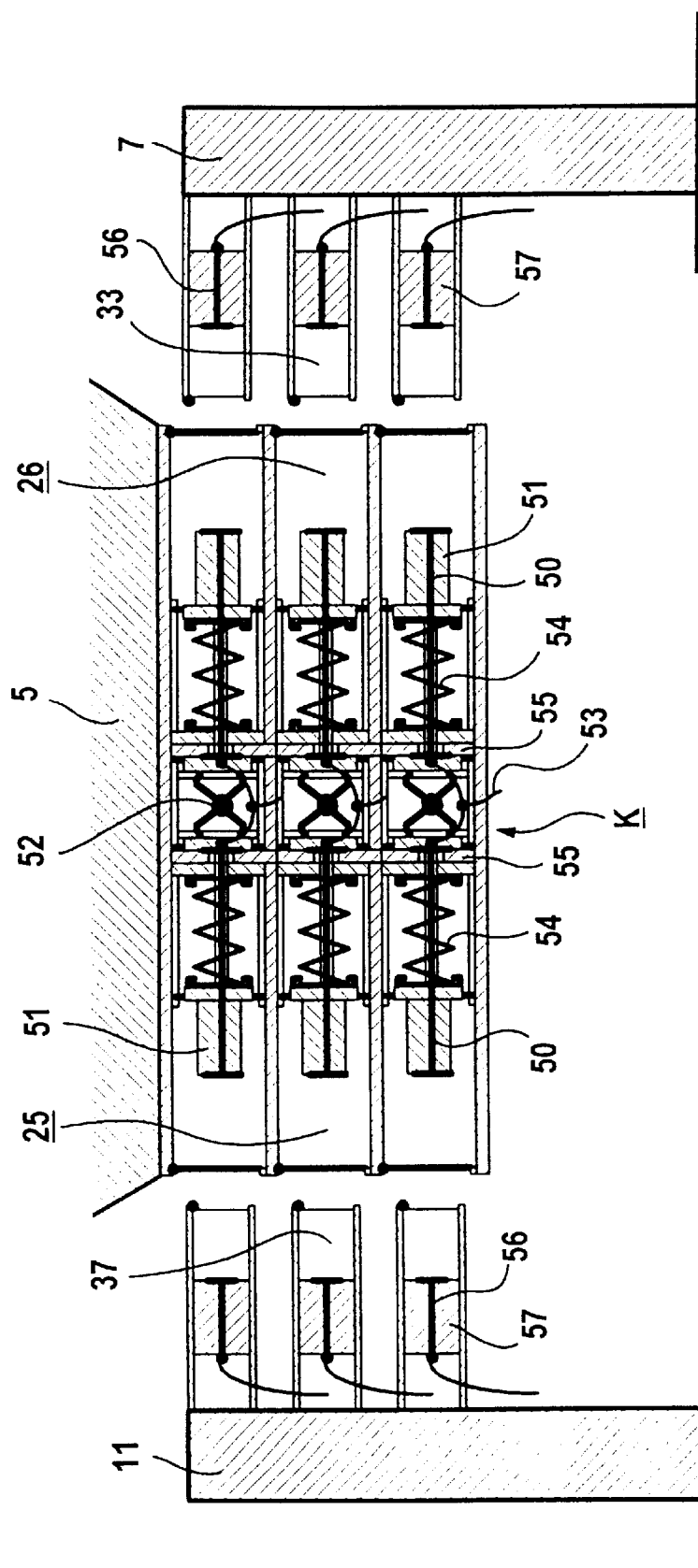
FIG. 4 shows an electrical contact, which is particularly suitable for the power supply system according to the present invention, in the open position.
Figure 5:
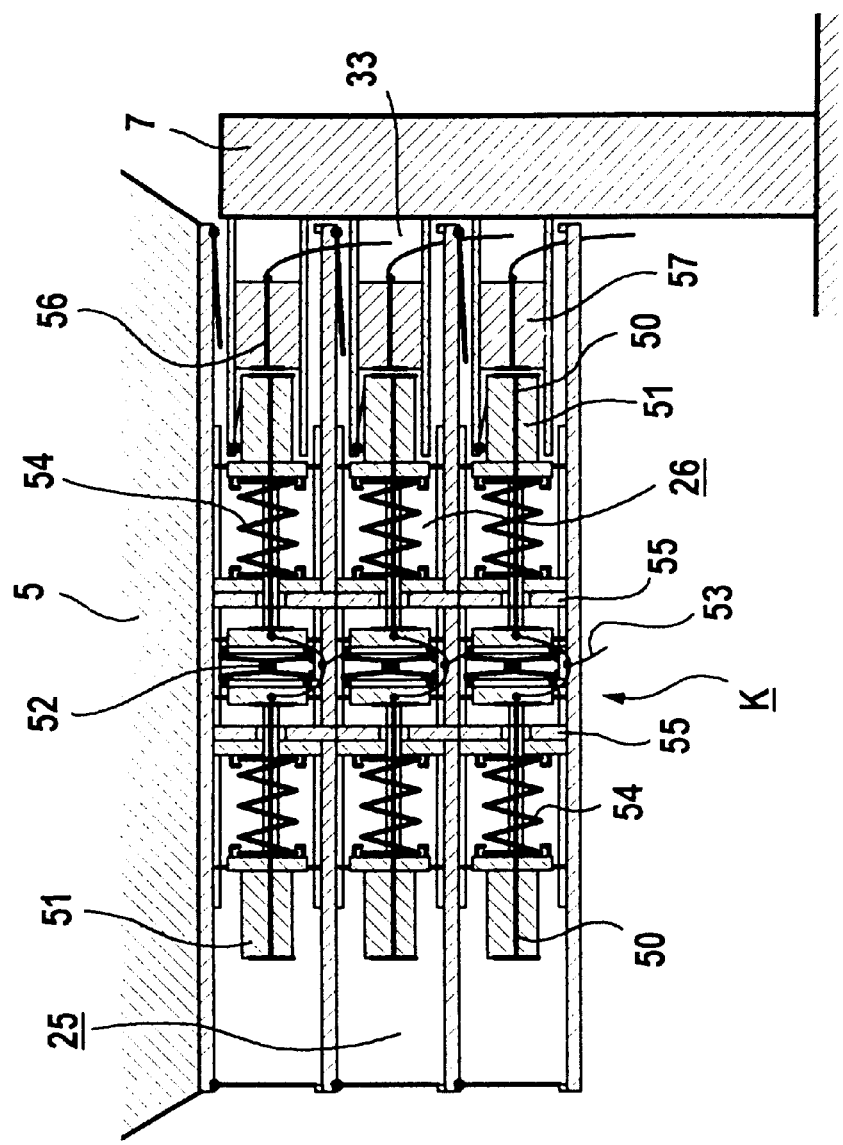
FIG. 5 shows the electrical contact according to FIG. 4 in one of its closed positions.
Figure 5:
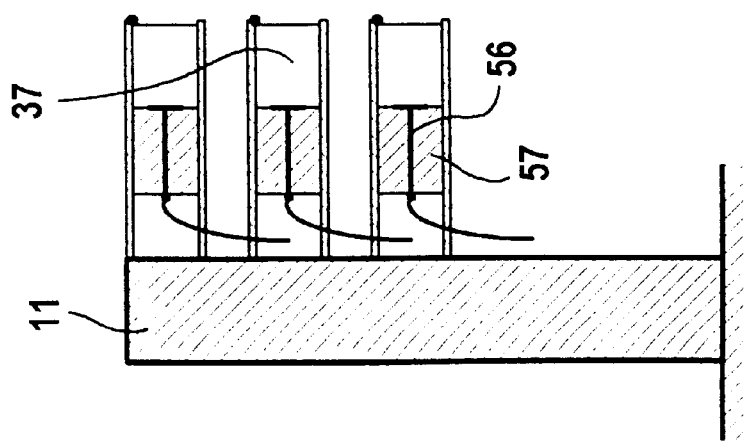

FIGS. 4 and 5 show an exemplary embodiment of the design refinement of the contacts and mating contacts using the example of switch 5, the track being supplied via switch 5.

Contacts 25 and 26 are arranged on the lower side of switch 5 while, in contrast, mating contact 33 is arranged on rigid track part 7 of transfer point 3, and mating contact 37 is connected to drive region 11. Contacts 25 and 26 and mating contacts 33 and 37 are designed as having three phases, each phase of contacts 25 and 26 as well as each phase of mating contacts 33 and 37 being designed identically, and the three phases being arranged in parallel with one another. Contacts 25 and 26 form a three-position contact K, which allows there to be one open position and two closed positions. Contacts 25 and 26 have one contact element 50 for each phase, said contact element 50, in each case, being routed in an electrically insulated guide 51.

The three phases of contact 25 are each connected to the corresponding phases of contact 26 via, in each case, one connecting element 52. Furthermore, the corresponding phases of contact 25 and the corresponding phases of contact 26 are electrically conductively connected to one another via, in each case, one electrical cable 53, and are connected to the corresponding phase of the stator in switch 5.

Furthermore, three contact elements 50 of each phase of contacts 25 and 26 can be moved back to the rest position, in each case, using one spring 54. Springs 54 are thus unstressed when contacts 25 and 26 are in the open position (FIG. 4) and are stressed when contacts 25 and 26 are in the two closed positions (FIG. 5).

When three-position contact K is in the open position, three contact elements 50 of contact 25 and three contact elements 50 of contact 26 are in contact, in each case, with one short-circuiting bar 55. Connecting elements 52 and springs 54 ensure that contact elements 50 of contacts 25 and 26 move synchronously.

Three-phase mating contacts 33 and 37 likewise each have a contact element 56, which is likewise guided in an electrically insulated guide 57.

When three-position contact K is opened, its structural design ensures that a three-phase short circuit occurs first through contact elements 50 contacting short-circuiting bar 55, and three contact elements 50 of contact 26 are then disconnected from three contact elements 56 of mating contact 33. This reliably prevents any arc from being formed between contact 26 and mating contact 33.

What is claimed is:

1. A power supply system for a long-stator drive, comprising:
    at least two independent tracks, each of the at least two independent tracks including at least one long-stator section, the at least one long-stator section being split into a plurality of drive regions, each of the plurality of drive regions capable of independently driving a vehicle; and
    at least one track-changing device including at least one electrical contact, the at least one track-changing device positively guiding the at least one electrical contact to selectively produce or eliminate an electrical connection between the at least one long-stator section of a first one of the at least two independent tracks and the at least one long-stator section of a second one of the at least two independent tracks.

2. The power supply system according to claim 1, wherein stator winding cables are connected directly to the at least one electrical contact.

3. The power supply system according to claim 1, wherein section cables of the plurality of drive regions are connected to the at least one electrical contact.

* * * * *